Dec. 3, 1968 K. REINTHALER 3,414,686
QUICK CHANGE ADAPTER FOR MICROPHONES
Filed Oct. 6, 1964 2 Sheets-Sheet 1
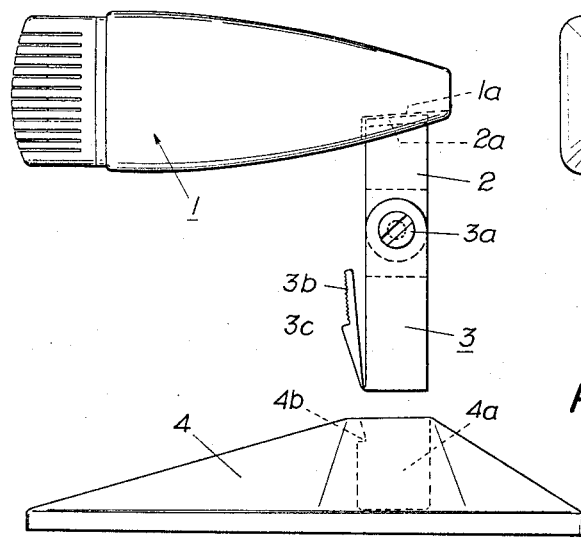
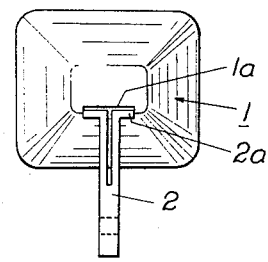
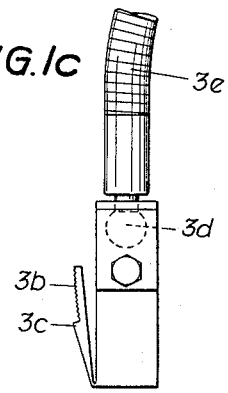
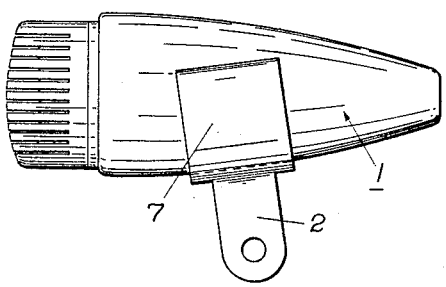
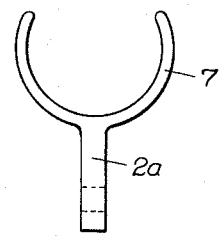
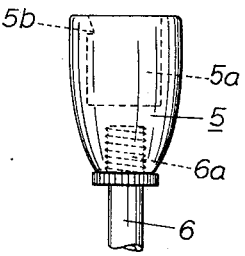
INVENTOR
KARL REINTHALER
BY Frank R. Trifari
AGENT

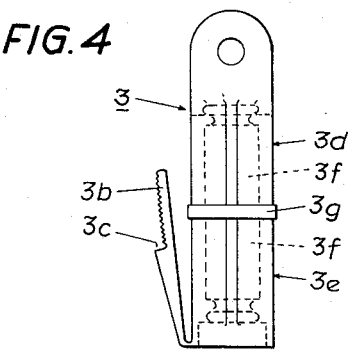
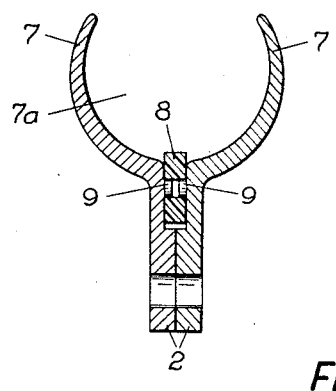
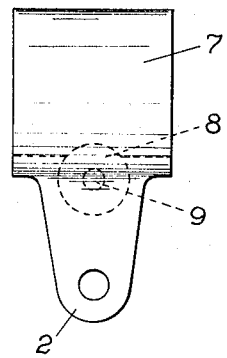
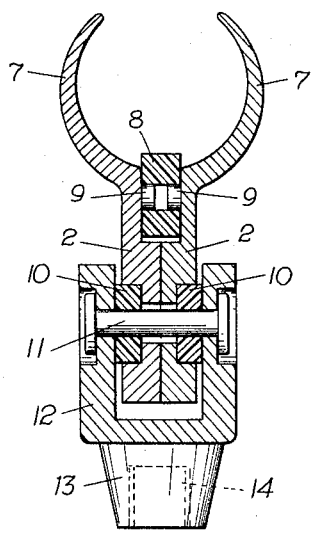

United States Patent Office 3,414,686
Patented Dec. 3, 1968

3,414,686
QUICK CHANGE ADAPTER FOR MICROPHONES
Karl Reinthaler, Vienna, Austria, assignor to Akustische u. Kino-Gerate Gesellschaft m.b.H., Vienna, Austria
Filed Oct. 6, 1964, Ser. No. 401,878
Claims priority, application Austria, Oct. 7, 1963, A 8,017/63
3 Claims. (Cl. 179—149)

ABSTRACT OF THE DISCLOSURE

A quick change adapter for attaching a portable microphone to a base, generally a table mount or a stand. The adapter includes a clamping element for retaining the microphone, a detent actuated locking element for positively fastening the adapter to the base and an articulated joint for enabling movement of the microphone when the microphone is attached to the base.

---

A microphone is generally mounted on a support, which consists of a stand for being placed on a table, or of a tripod similar to a tripod for photographic purposes. Microphones which are inherently provided with a support are additionally provided with means for a connection to a stand. This connecting means in the form of a tapped bore is provided because a suitable surface for supporting the microphone is not always available. Besides, it is not very desirable to place a microphone on a table top because the table top might act as an acoustic shield or might pick up noise and transmit it to the microphone. On the other hand, the friction between the table top and the microphone is so small that small forces acting on the cable will be sufficient to cause the microphone to fall down.

The above disadvantages are avoided by the adapter provided according to the invention for a quick connection between the microphone and the stand so that even unskilled persons can quickly and reliably mount a microphone on or remove it from a stand.

According to the invention, this adapter is characterized in that it comprises a retaining part, which is adapted to be inserted into or fitted onto a microphone housing, and that the adapter terminates in a profiled part, which can be inserted into an opening conforming to the cross-section of the profiled part and formed in a stand or in a connector which is adapted to be screw-connected to a stand.

In order to prevent an unintended elimination of the connection it is suitable to provide the profiled part, e.g., with a detent spring, and to provide in the opening in the stand a shoulder, which forms an abutment for the detent spring when the adapter is inserted. In order to enable the lifting of the projection of the detent spring from the nose in the opening when the connection is to be eliminated, the spring has an extension forming a grip face, which is readily accessible at any time.

The invention will now be described more fully with reference to the accompanying drawings, in which FIG. 1a is a side elevation showing a microphone having attached to it an adapter according to the invention, which adapter is adapted to be inserted into a table stand, which is shown below the adapter.

FIG. 1b is a rear elevation showing the microphone and the adapter.

FIG. 1c shows the adapter with a ball-and-socket joint and a flexible holder for the microphone.

FIG. 2 shows the connector, which is required for mounting the microphone provided with the adapter on a stand.

FIGS. 3a and 3b show another fixation of the microphone to the adapter.

FIG. 4 shows an adapter according to the invention, which is provided with a sound-lagging insert, and FIGS. 5a, 5b and 6 show further embodiments of the adapter.

In FIGS. 1a and 1b, 1 denotes the housing of the microphone to be mounted on the stand. This microphone has a slotlike opening 1a, which receives a correspondingly shaped, preferably shoe-like portion 2a provided at the free end of the section 2 of the adapter according to the invention. Section 2 is connected to section 3 by an adjustable articulated joint 3a so that the microphone can be pivotally moved in a vertical plane. This connection might be omitted, if desired, so that the sections or parts 2 and 3 form a single, rigid body. As has already been mentioned, the articulated joint may alternatively be provided by a ball-and-socket joint 3d, a flexible tube 3e or the like (FIG. 1c). FIG. 1a shows only the articulated joint which has provided satisfactory. In this joint, one section, in FIG. 1a the section 3, has a slot, which receives a tonguelike extension of section 2. A bore which extends through both sections receives a screw by which both parts may be held together with the required friction.

Section 3 consists of a profiled part. It may have any desired cross-section, such as rectangular, square, oval, etc. The profiled part is to be inserted into a table stand 4, which is formed with an opening 4a, which corresponds substantially to the form of the profiled part 3. The cross-section of this part may be so selected that it cannot be inserted in only one but in three positions into the opening.

To lock the adapter inserted into the opening 4a against falling out, the portion 3a is provided according to the invention with a detent spring, which has a projection 3c, which bears on a shoulder 4b in the opening 4a. In order to enable the removal of the adapter from its support, e.g., the table stand 4, the detent spring has an extension 3b, which forms a finger pressure plate. When the portion 3b of the detent spring is forced against the part 3, the projection 3c is simultaneously lifted from the shoulder 4b in the opening 4a and the adapter can now readily be withdrawn from the opening 4a. The adapter is preferably made from plastic material. The part 3 may be made integrally with the detent spring 3b, 3c. Alternatively, part 3 may be provided with a resilient metal tongue. The adapter itself may be made entirely from any desired, suitable material.

For cases in which a table stand is not available or cannot be used and a tripod must be employed, FIG. 2 shows a connector 5, which is formed with the opening for receiving the part 3 of the adapter and has at its lower end a tripod screw thread 6a for a screw-threaded connection to the tripod 6. There is no need for this connector if the tripod head has been provided by its manufacturer with a suitable opening like the table stand.

Such a connector or such a tripod head is provided with an opening 5a having a nose 5b for retaining the part 3 of the adapter.

In order to enable the fixation of a microphone to a stand with the aid of an adapter according to the invention when the housing of the mircophone does not have a slot-like opening for receiving the shoe-like extension of part 2, the adapter may be provided with a slotted sleeve at its end facing the microphone and the microphone may be inserted into such sleeve.

If the adapter according to the invention consists of two sections 2 and 3, as is shown in FIG. 1, different sections 2 may be provided, depending on the type of the microphone, which sections are designed for holding the various types of microphones or housings. In this case a suitable section 2 will be selected and assembled with the part 3 to form an adapter for connecting the microphone to the stand.

An illustrative embodiment is shown in FIGS. 3a and 3b. At its end adjacent to the microphone, the section 2 carries a bifurcated clamp 7, the legs of which embrace the microphone 1 to such an extent that the microphone is retained by the clamp. The clamp 7 may be integral with the section 2 and consists, e.g., of a suitable plastic material or it may consist of a resilient metal and be mounted on the section 2 and connected to it, e.g., by screws, rivets or in that the section 2 is molded around the sleeve.

Instead of consisting of resilient material, the clamp 7 may be, e.g., die-cast or injection-molded from metal or thermoplastic material. This embodiment is shown in a sectional view and in side elevation in FIGS. 5a and 5b, respectively. In order to ensure that the microphone will be reliably retained in such a clamp, the latter formed with a lateral opening 7a at the intersection of said furcations into which a piece 8 of resilient material, such as rubber, polyvinylchloride, etc., is inserted in such a manner that it protrudes partly out of the cylindrical inside surface of the sleeve. The microphone is perfectly retained in position owing to the friction between the microphone housing and the resilient element. To prevent chafing and an excessive wear of the resilient element 8 when the microphone is being inserted, the element 8 consists suitably of a roller which is mounted on a bearing pin 9.

This means for retaining a microphone has the advantage that the housing cannot be scratched by resilient clips when the microphone is being inserted into the retainer. Besides, this type of retainer does not require an exact manufacture, because the resilient insert 8 in the clamp 7 affords large tolerances.

In order to prevent a transmission of disturbing mechanical vibration, such as structure-borne sound, from the stand to the microphone, the adjustability may be eliminated and the articulated joint connecting the two sections 2 and 3 may be replaced by a resilient, sound absorbing insert. If it is not desired to abandon the adjustability, either section 2 or section 3 may be split in itself and the resilient, sound-absorbing insert may be provided at the joint in the split section. Such an embodiment is shown in FIG. 4. In this embodiment, the section designated 3 in FIG. 1 has been chosen. A corresponding modification of section 2 is also possible. Both sections 2 and 3 may be provided with a sound-absorbing insert, if desired.

Portions 3b and 3c constitute the detent spring which has already been discussed with reference to FIG. 1. The profiled part 3 is divided into the two sections 3d and 3e so that the resilient, sound-absorbing insert may be provided. This insert has two extensions 3f, which extend from both sides of a collar 3g and fill apertures, e.g., in the form of noncircular bores, in sections 3d and 3e. The collar 3e prevents an abutting of the above-mentioned two sections of the profiled part 3 so that disturbing mechanical vibrations cannot be transmitted. Portions 3f and 3g of the resilient insert may either form together an integral body or consist of three separate parts, which are assembled to form a unit.

The last-mentioned possibility is shown in FIG. 4. The sections are held together by a tubular rivet or a bolt and nuts. The bores receiving the parts 3f of the resilient, sound-absorbing material are preferably non-circular, in order to prevent a rotation. If such a rotation is desired, however, the bores will be cylindrical. In both cases it is obviously necessary to provide means to prevent the two parts 3d and 3f from being unintendedly pulled apart.

FIG. 6 shows a further embodiment of the adapter, which consists in this case of two sections, which are articulatedly interconnected. Just as in FIG. 5a, a piece 8 of plastic material is provided within the clamps 7. The connection of the adapter to the tripod head 12, which carries screw threads 14, is established by two interposed resilient shaped elements 10. The tightening bolt 11 holds the parts 7, 10 and 12 together and ensures at the same time the required frictional engagement between the parts of the articulated joint. These parts are designed so that the tightening bolt 11 is in mechanical contact with the parts 10 and 12 and there is also a mechanical contact between parts 7 and 10. As a result, the parts 7 and 12 are connected only by the resilient inserts and disturbing noise cannot be transmitted from part 12 and to part 3.

What is claimed is:

1. A quick change adapter for a microphone comprising a first elongate section having means adapted to engage a microphone on one end, a second elongate section, and articulated joint interconnecting said first and second sections, and a spring detent mounted on the end of said second elongate section remote from said articulated joint wherein said spring detent comprises a resilient member extending parallel to said second elongate section and pivotally attached to said remote end of said second elongate section, and a projection extending normally from the side face of said resilient member remote from said second section, said remote end of said second elongate section with said spring detent coupled thereto being adapted to be inserted in an opening in a mounting means wherein said projection is adapted to engage a shoulder located interiorly of said opening.

2. A quick change adapter for a microphone according to claim 1 further comprising a bifurcated clamping means attached to the end of said first section remote from said articulated joint for receiving a microphone and a resilient insert attached to said clamping means at the intersection of said furcations to frictionally engage a microphone received by said bifurcated clamping means.

3. A quick change adapter for a microphone according to claim 1 wherein at least one of said first and second sections includes a sound-absorbing insert therein, said sound-absorbing insert comprising a resilient sound-absorbing material inserted into one of said sections, wherein said section including said insert comprises two parts with said insert interposed therebetween.

References Cited

UNITED STATES PATENTS 3,153,123  10/1964  Harman _____ 179—148

OTHER REFERENCES

Burstein-Applebee Co., Catalog 641, published 1963.
Cameradio Company, 1963 Catalog (p. 244), published 1962.

WILLIAM C. COOPER, *Primary Examiner.*